United States Patent
Ono et al.

(10) Patent No.: US 10,152,044 B2
(45) Date of Patent: Dec. 11, 2018

(54) CONTROL DEVICE FOR MACHINE TOOL

(71) Applicant: MAKINO MILLING MACHINE CO., LTD., Tokyo (JP)

(72) Inventors: Kenichi Ono, Aiko-gun (JP); Toshimasa Uetama, Aiko-gun (JP); Hideki Heishi, Aiko-gun (JP); Rie Kawai, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 234 days.

(21) Appl. No.: 15/102,461

(22) PCT Filed: Dec. 26, 2013

(86) PCT No.: PCT/JP2013/084975
§ 371 (c)(1),
(2) Date: Jun. 7, 2016

(87) PCT Pub. No.: WO2015/097828
PCT Pub. Date: Jul. 2, 2015

(65) Prior Publication Data
US 2017/0031345 A1 Feb. 2, 2017

(51) Int. Cl.
*G05B 19/00* (2006.01)
*G05B 19/409* (2006.01)

(52) U.S. Cl.
CPC .. *G05B 19/409* (2013.01); *G05B 2219/36071* (2013.01); *G05B 2219/36102* (2013.01); *G05B 2219/36152* (2013.01)

(58) Field of Classification Search
None
See application file for complete search history.

(56) References Cited

U.S. PATENT DOCUMENTS

| | | | | |
|---|---|---|---|---|
| 5,920,866 A | * | 7/1999 | Crim | G06F 17/30292 |
| 7,062,711 B2 | * | 6/2006 | Kethireddy | G06F 17/30864 |
| | | | | 715/705 |

(Continued)

FOREIGN PATENT DOCUMENTS

| | | |
|---|---|---|
| CN | 103365250 | 10/2013 |
| DE | 102013103000 | 9/2013 |

(Continued)

OTHER PUBLICATIONS

International Search Report dated Apr. 8, 2014, directed towards PCT Application No. PCT/JP2013/084975; 2 pages.

*Primary Examiner* — Paul B Yanchus, III
(74) *Attorney, Agent, or Firm* — Morrison & Foerster LLP

(57) ABSTRACT

This control device for a machine tool has a display unit that displays an input screen via which machining information regarding machining to be performed on a workpiece is inputted and an input unit via which letters and/or numbers are inputted into machining-information fields on the input screen. When a machining-information field on the input screen is selected, the display unit displays a first input-assistance screen corresponding to said field. Input-support buttons are laid out on said first input-assistance screen. When an input-support button is pressed, a second input-assistance screen is displayed, and via an operation performed in accordance with said second input-assistance screen, the aforementioned field is filled in.

3 Claims, 10 Drawing Sheets

(56) References Cited

U.S. PATENT DOCUMENTS

| | | | |
|---|---|---|---|
| 2002/0152003 A1 | 10/2002 | Shinozaki et al. | |
| 2005/0278652 A1* | 12/2005 | Scholz | G06F 3/0482 715/780 |
| 2010/0264119 A1 | 10/2010 | Watanabe et al. | |
| 2016/0136861 A1* | 5/2016 | Konig | B29B 7/46 264/211.23 |

FOREIGN PATENT DOCUMENTS

| | | |
|---|---|---|
| EP | 0476139 | 3/1992 |
| EP | 0 852 346 | 7/1998 |
| EP | 2677379 | 12/2013 |
| JP | 60-175555 | 11/1985 |
| JP | 5-2207 | 1/1993 |
| JP | 7-93011 | 4/1995 |
| JP | 7-151512 | 6/1995 |
| JP | 8-190413 | 7/1996 |
| JP | 2002-312008 | 10/2002 |
| JP | 2005-135095 | 5/2005 |
| JP | 2007-242054 | 9/2007 |
| JP | 2011-110646 | 6/2011 |
| JP | 2011-227584 | 11/2011 |
| JP | 2012-104136 | 5/2012 |
| JP | 2013-58219 | 3/2013 |
| JP | 2013-200766 | 10/2013 |
| WO | WO-2009/069207 | 6/2009 |

\* cited by examiner

CONTROL DEVICE FOR MACHINE TOOL

CROSS-REFERENCE TO RELATED APPLICATION

This application is a U.S. National Stage patent application of International Patent Application No. PCT/JP2013/084975, filed Dec. 26, 2013, which is hereby incorporated by reference in the present disclosure in its entirety.

FIELD OF THE INVENTION

The present invention relates to a control device of a machine tool.

BACKGROUND ART

In a conventional technique, a machine tool which carries out machining of a workpiece such as cutting by a tool which is moved relatively thereto is known. Further, in such a machine tool a numerical value control type machine tool is known where the path of the tool is specified by coordinates of a predetermined axis and machining is carried out while moving the tool with respect to the workpiece. The control device for machine tool can automatically carry out machining by changing the relative position of the tool with respect to the workpiece by moving at least one of the workpiece and the tool by a moving device.

Japanese Unexamined Utility Model Publication No. 5-2207 discloses a numerical control device comprising a setting display device with which has a screen selection key and a window key. It is disclosed that when the screen selection key is pressed, the screen selection windows are superimposed and when the window key is pressed, various types of operation support windows are superimposed.

Japanese Unexamined Patent Publication No. 7-93011 discloses a numerical control device which displays a pop-up window when various types of control data are changed and reset to make the changing and resetting easy.

CITATIONS LIST

Patent literature 1: Japanese Unexamined Utility Model Publication No. 5-2207

Patent literature 2: Japanese Unexamined Patent Publication No. 7-93011

SUMMARY OF THE INVENTION

Technical Problem

In a numerical control type machine tool, machining information to automatically carry out machining of a workpiece is required. For example, a processing program in which movement information to change the relative position of the tool with respect to the workpiece is predetermined, is prepared. The control device for the machine tool drives the movement device of the machine tool based on the processing program. Further, the machining information required to machine the workpiece includes not only the processing program but also, for example, information about the tool such as the type, length and diameter thereof, and information regarding the coordinate system used in the processing program.

The user sets these various types of processing information into the machine tool prior to machining the workpiece so that the desired machining of the workpiece can be carried out. As the processing information may be required to be inputted or edited, the control device of the machine tool is formed such that an input screen which allows inputting and editing of processing information can be displayed.

In the input screen in which processing information is input or edited, a button which supports the input may be provided. In the prior art, however, there was the problem that the position of the button which is used to support the input of processing information items was difficult to locate and difficult to use. Accordingly, there was the problem that despite the control device having an advantageous input support function, it was not sufficiently used.

For example, when the set value of each axis in the workpiece coordinate is inputted into the input screen, despite the large number of types of measuring methods for the workpiece being prepared, there were cases in which the optimal measuring method was not selected for carrying out measurement due to the selection method being unknown. As a result, the operational efficiency of inputting processing information deteriorated and there were cases of human error such as inputting errors.

A control device according to the present invention is a control device for a machine tool which carries out processing by the relative movement of a tool with respect to a workpiece based on a processing program. The control device comprises a display part which displays an input screen for inputting or editing processing information related to processing the workpiece, and an input part for inputting at least one of letters and numbers into an item of the processing information in the input screen. The display part, when one item of the processing information is selected in the input screen, displays a first input auxiliary screen corresponding to the one item, and an input support button corresponding to the one item is provided on the first input auxiliary screen in order to support input.

In the above invention, a second input auxiliary screen corresponding to the input support button can be displayed when the input support button is pressed, and by carrying out an operation according to the second input auxiliary screen, the one item can be inputted.

In the above invention, the control device can further comprise a measurement information acquiring part which acquires the measurement result of performing a measurement of a tool or the workpiece, the first input auxiliary screen can be provided with a first input support button to carry out measurements, a second input auxiliary screen can be displayed when the first input support button is pressed, the second input auxiliary screen can display a plurality of second input support buttons to select the type of measurement, and a third input auxiliary screen can be displayed to carry out the selected type of measurement when the second input support button is pressed.

In the above invention, the control device can further comprise a measurement information acquiring part which acquires a measurement result of performing a measurement of a tool or the workpiece, the display part can display an another input auxiliary screen when an input support button provided on the one input auxiliary screen is pressed, the operation can be performed by repeatedly displaying the input auxiliary screen and pressing the input support button, until the measurement of the tool or measurement of the workpiece is completed, and the measurement result of the tool or the workpiece can be acquired and can be input into the one item of the input screen.

In the above invention, the first input auxiliary screen may have an input region to input information formed of at least one of letters and numbers. If the input information input into the input region violates the predetermined rules, a warning message can be displayed in the first input auxiliary screen.

Advantageous Effects of Invention

According to the present invention, a control device for machine tool is provided which can improve the work efficiency when processing information is inputted.

DETAILED DESCRIPTION OF T

Embodiments of the control device for machine tool will be described with reference to FIG. 1 to FIG. 10. The machine tool in the embodiments is of a numerical control type which carries out machining by the relative movement of a tool and workpiece based on a processing program.

Figure 1:
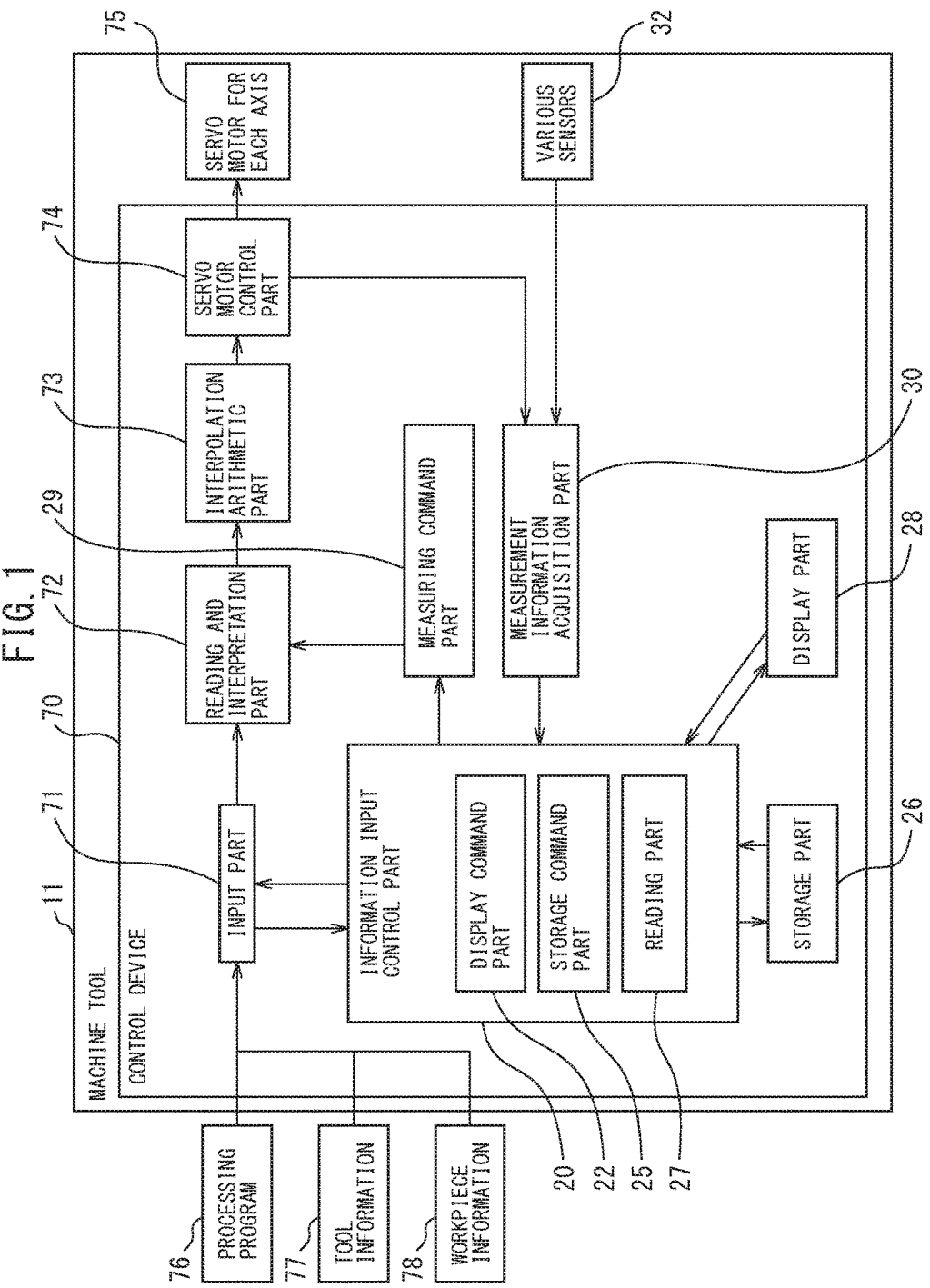
FIG. 1 is a block diagram of a machine tool according to an embodiment.

FIG. 1 is a block diagram of a machine tool of the present embodiment. The machine tool 11 comprises a control device 70 which controls the movement device of each axis and sets the processing information. The control device 70 may be configured of, for example, a CPU (Central Processing Unit), RAM (Random Access Memory), and ROM (Read Only Memory) etc., mutually connected via a bus.

The control device 70 comprises an input part 71, a reading and interpretation part 72, an interpolation arithmetic part 73 and a servo-motor control part 74. When a workpiece is machined based on the processing program 76, the user creates the processing program 76. Alternatively, the processing program 76 may be created by CAM (Computer Aided Manufacturing) device based on the target shape of the workpiece. The target shape of the workpiece may be created by a CAD (Computer Aided Design) device.

Processing information such as the processing program 76 is inputted into the input part 71. Information such as the relative movement of the tool with respect to the workpiece is included in the processing program 76. Commands for the machine tool by, for example, a G code or an M code is included in the processing program 76. Further, processing information such as tool information 77 or workpiece information 78 is input into input part 71. Information related to the tool such as the type of tool e.g. a drill or end mill, the diameter of the tool, and the length of the tool is included in the tool information 77. Information related to the workpiece to be machined is included in the workpiece information 78. The inputting of the processing information to the input part 71 may be carried out manually by a user or an electronic file including various pieces of information may be inputted.

The reading and interpretation part 72 reads the processing program 76 etc. from the input part 71. The reading and interpretation part 72 sends the movement command to the interpolation arithmetic part 73. The interpolation arithmetic part 73 calculates the position command value for each interpolation period. For example, the interpolation arithmetic part 73 calculates the amount of movement for each time interval set based on the movement command. The interpolation arithmetic part 73 sends the position command value to the servo motor control part 74. The servo motor control part 74 calculates the amount of movement of each axis such as the X-axis, Y-axis and Z-axis based on the position command and drives the servo motor 75 for each axis.

The machine tool 11 carries out machining based on each type of processing information. The processing information related to machining may include, in addition to the aforementioned processing program 76, tool information 77 and workpiece information 78, for example, coordinate information. Coordinate information used in the processing program 76 is included in the coordinate information. Machine coordinates whose origin is defined by a predetermined point of the machine tool are included in the machine tool coordinate system. With respect thereto, for example, workpiece coordinates whose origin is defined by an arbitrary point on the workpiece may be set. The workpiece coordinates move together with the workpiece when the workpiece moves. The workpiece coordinates can be set by setting the position thereof relative to the machine coordinates. Other coordinate information different from such machine coordinates may be included in the coordinate information. Further, in the case that a plurality of coordinates are used in the processing program 76, the information for the plurality of coordinates is included in the coordinate information.

Further, parameters of the control device may be included in the processing information. For example, information on the processing conditions specified with the operation panel of the control device may be included in the processing information. As such a processing condition, the override value related to the movement speed may be exemplified. Further, information related to a coolant etc. may be included in the processing condition.

The control device 70 of the machine tool 11 of the present embodiment comprises an information input control part 20, a display part 28 which displays the processing information, and a storage part 26 which stores the processing information. The information input control part 20 generates the processing information required to carry out the present processing and sends it to the input part 71. Further, the information input control part 20 edits the processing information input into the input part 71 and sends it to the input part 71 as new processing information. For example, the processing program input to the input part 71 is edited and is sent to the input part 71 as the processing program for the present processing. Further, processing information, such as the override value input with the operation panel 41, is also received by the information input control part 20. In this way the information input control part 20 can newly create or edit processing information.

The information input control part 20 includes a display command part 22, a storage command part 25 and a reading part 27. The storage command part 25 stores newly created or edited processing information in the storage part 26. The reading part 27 reads the processing information stored in the storage part 26. The display part 28 displays the processing information based on a command from the display command part 22.

The information input control part 20 of the present embodiment may display on the display part 28, past processing information as reference information to generate processing information to be used for the present processing. The past processing information may be stored in the storage part 26. A user may set the processing information for the present processing while checking the past information.

Note that, the storage part 26 according to the present embodiment, is provided in the control device 70. However, not being limited thereto, the storage part 26 may be provided outside the control device 70. For example, a storage part such as a memory card or a hard disk may be connected to the control device via a communication interface.

It may be preferable that the set value of the present processing is fixed after carrying out measurements on the workpiece or tool in the processing information. With regards to the tool information 77, even if the tool is the same as a tool used in the past, it may be unclear whether or not the past tool information will coincide. For example, the diameter etc. of a tool may change when grinding of the tool is carried out. Accordingly, it is preferable that regarding the tool information 77, the tool is remeasured and that the measurement results for the tool are input as tool information for the present processing.

Further, with regards to the coordinate information, there are cases where it is unclear whether or not past coordinate information will match. A workpiece is held on a table by a holder. There are cases when the position of the workpiece held on the table is slightly displaced. For example, there are cases when the offset value of the workpiece coordinates with respect to the machine coordinates change. Accordingly, it is preferable to remeasure the coordinate information for the present processing.

The machine tool of the present embodiment is formed such that the tool or the workpiece can be measured. For example, by measuring the tool, tool information such as the tool diameter can be determined. Further, by measuring the workpiece, for example, an offset value of the workpiece coordinate system with respect to the machine coordinate system can be determined.

The machine tool of the present embodiment is formed such that the measurement method of the tool or workpiece can be selected from a manual method or an automatic method. A screen for supporting measurement and a measurement program when measurement is carried out automatically are stored in the storage part 26. Further, the screen for supporting measurement when measurement is carried out manually is stored in storage part 26.

The control device 70 includes a measuring command part 29. The command to measure the workpiece or tool etc., from the information input control part 20, is sent to the measuring command part 29. The measuring command part 29 sends a command for a predetermined measurement to the reading and interpretation part 72 and measuring is carried out on the machine tool 11.

The control device 70 includes a measurement information acquisition part 30. The measurement information acquisition part 30 acquires information when measurement of the workpiece etc., is carried out. The measurement information acquisition part 30 receives signals from various sensors 32. Further the measurement information acquisition part 30 receives the coordinate value of the machine coordinates from the servo motor control part 74. Further, the measurement information acquisition part 30 sends the information to the information input control part 20. For example, there are cases when the machine tool is provided with a probe to function as a measuring device. The measurement information acquisition part 30 sends a signal of the probe contacting the workpiece etc. and the coordinate values of the machine coordinates of each axis at the time. The information input control part 20 can display on the display part 28 the processing information calculated as needed from the measured values.

Next, regarding a control device for machine tool according to the present embodiment, a more specific example will be described. The control device 70 according to this embodiment has a function of supporting an input operation at the time of inputting processing information.

Figure 2:
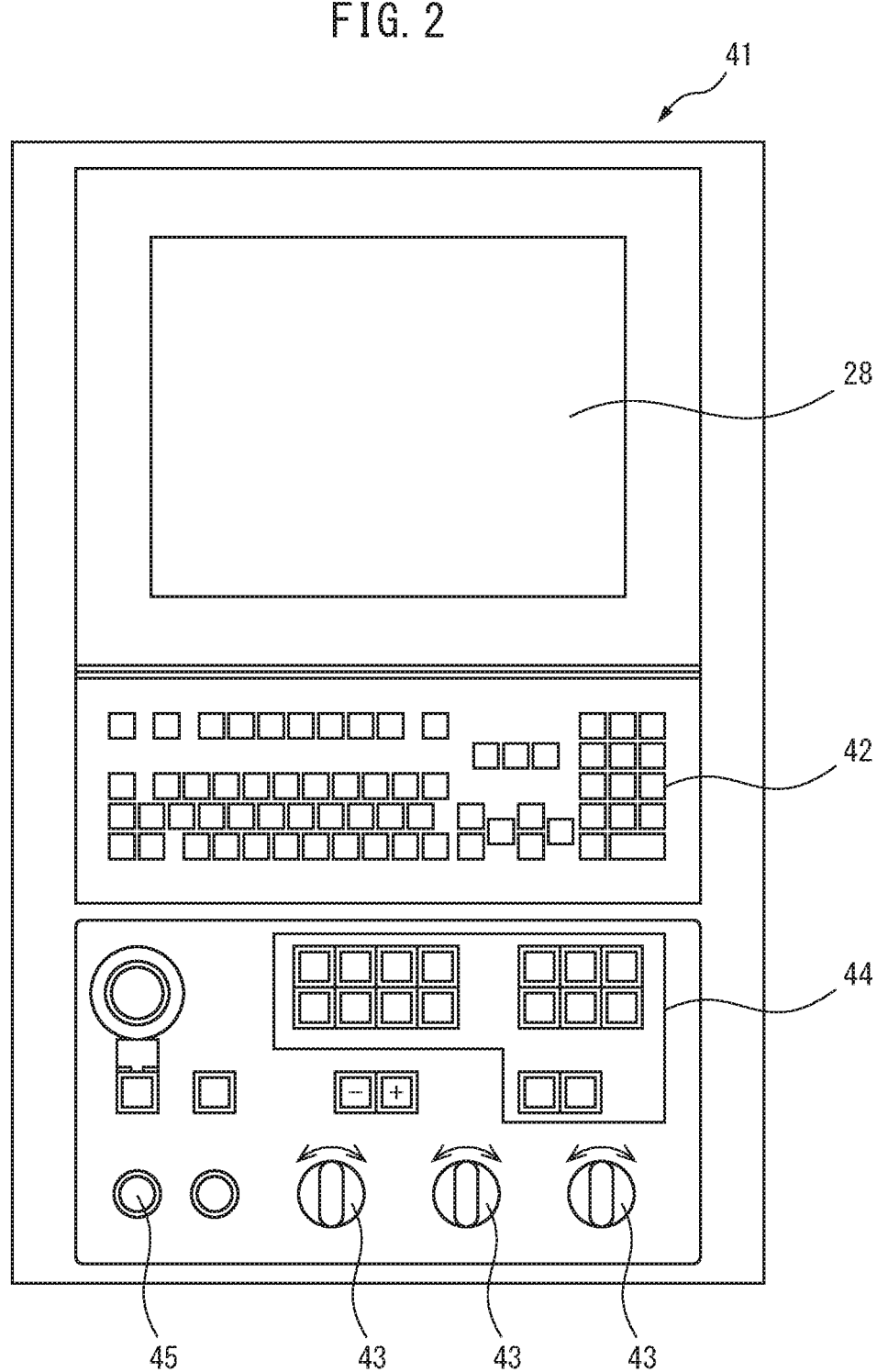
FIG. 2 is a schematic front view of the operation panel of the machine tool.

FIG. 2 is a front view of the operation panel provided on the control device for machine tool. The operation panel 41 includes a display part 28 on which processing information is displayed and processing information is input. The display part 28 according to the present embodiment uses a touch panel which can select a desired part by touching the screen.

The operation panel 41 includes a key input part 42. The key input part 42 is provided with a plurality of key switches. By pressing a key switch of the key input part 42, a predetermined number or letter can be input. Further the operation panel 41 includes an operation switch part 44 which carries out the selection of a predetermined operation, and an override setting part 43 which carries out setting of the override value. The override setting part 43 can, for example, set the override value of the rotational speed of the main spindle or the override value of the processing feed speed etc. By setting the override value, the speed specified in the processing program can be increased or decreased by multiplying a set ratio. Further, a measurement start button 45 to start measurement of the workpiece or tool, is provided in the operation panel 41.

FIGS. 3 to 10 illustrate the screens of display part 28 of the operation panel 41. The format of such screens for inputting the processing information is stored in the storage part 26 of the control device 70. With reference to FIGS. 3 to 10, in the lower side of the screen, a button area 54 is provided. The button area 54 is provided with buttons which carry out predetermined operations. Further, on the left side of the screen tabs 49a to 49d are provided to select the displayed contents.

By selecting the processing data management tab 49d, the processing data management screen is displayed. The processing data management screen allows processing information to be copied from the storage part 26 to the storage region for carrying out the present processing. Further, the processing data management screen allows the selection of processing information for carrying out the present processing from a plurality of pieces of processing information stored in the storage region.

Figure 3:
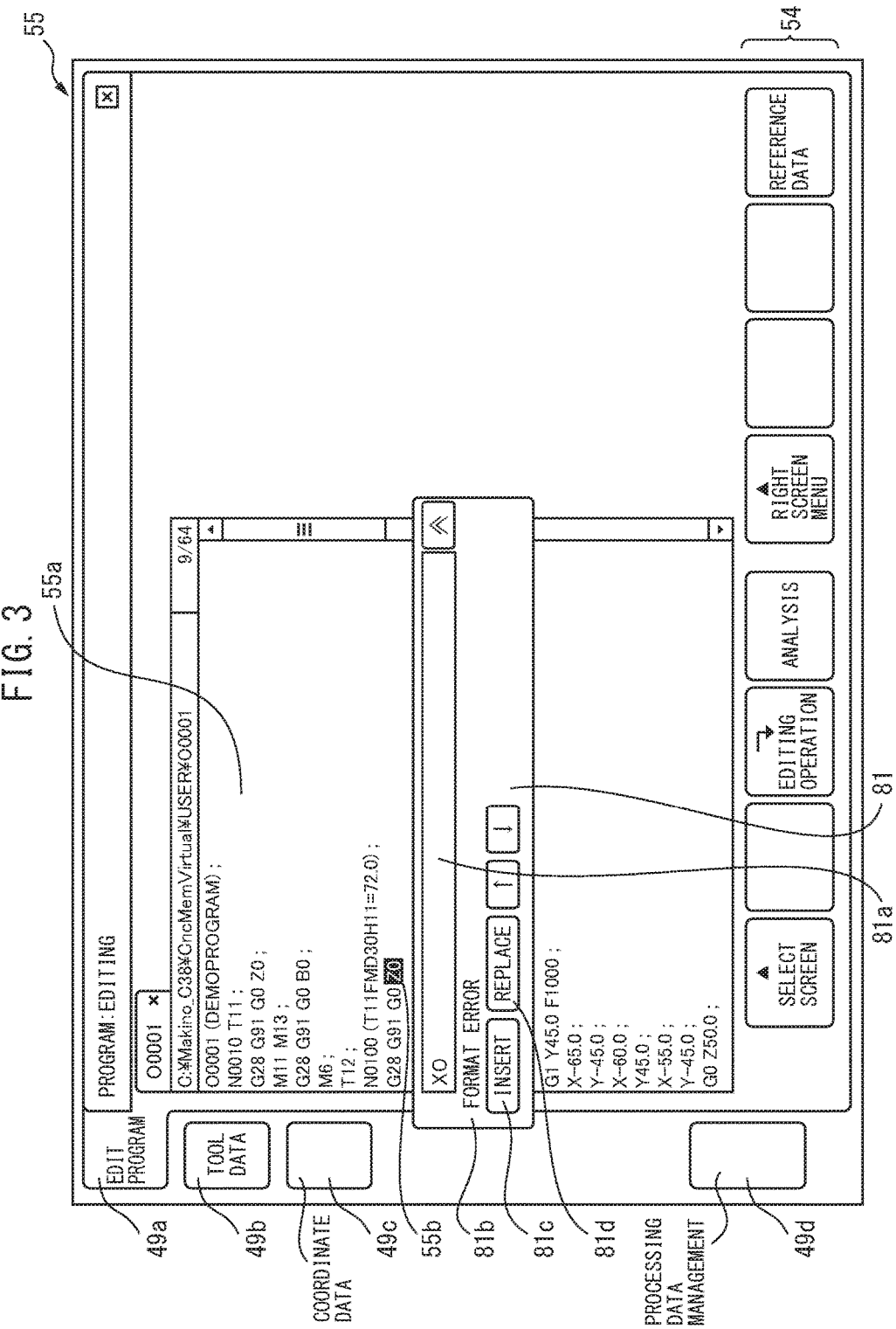
FIG. 3 is a schematic diagram describing the program editing screen.

FIG. 3 shows the program editing screen for displaying and editing the processing program. The program editing screen 55 is displayed when the program editing tab 49a is selected. The program editing screen 55 corresponds to the input screen for inputting or editing the processing program. The program editing screen 55 has a display region 55a which displays the contents of the processing program.

By a user selecting the selection part 55b to edit the processing program, the display part 28 displays an input auxiliary screen 81. The input auxiliary screen 81 has an input region 81a. Input information formed of letters and numbers, etc., is input into the input region 81a. Further, by pressing the buttons 81c and 81d, letters or numbers may be inserted in front of the selection part 55b or the selection part 55b may be replaced.

Furthermore, when the information input into the input region 81a is different to the predetermined format, a warning is displayed in the warning region 81b of the input auxiliary screen 81. The user may correct input errors on confirming the warning. In the example shown in FIG. 3, a warning is displayed to indicate that the letter "O" was mistakenly input instead of the number "0".

In this way, the control device of the present embodiment, when input information formed of at least one of letters and numbers are input into the input region of the input auxiliary screen, whether or not the input information matches the predetermined rules is judged. Further, if the predetermined rules are violated, the input auxiliary screen displays a warning. By displaying a warning on the input auxiliary screen, input errors by the user can be decreased. Further, inputting and editing the processing program can be easily carried out.

Figure 4:
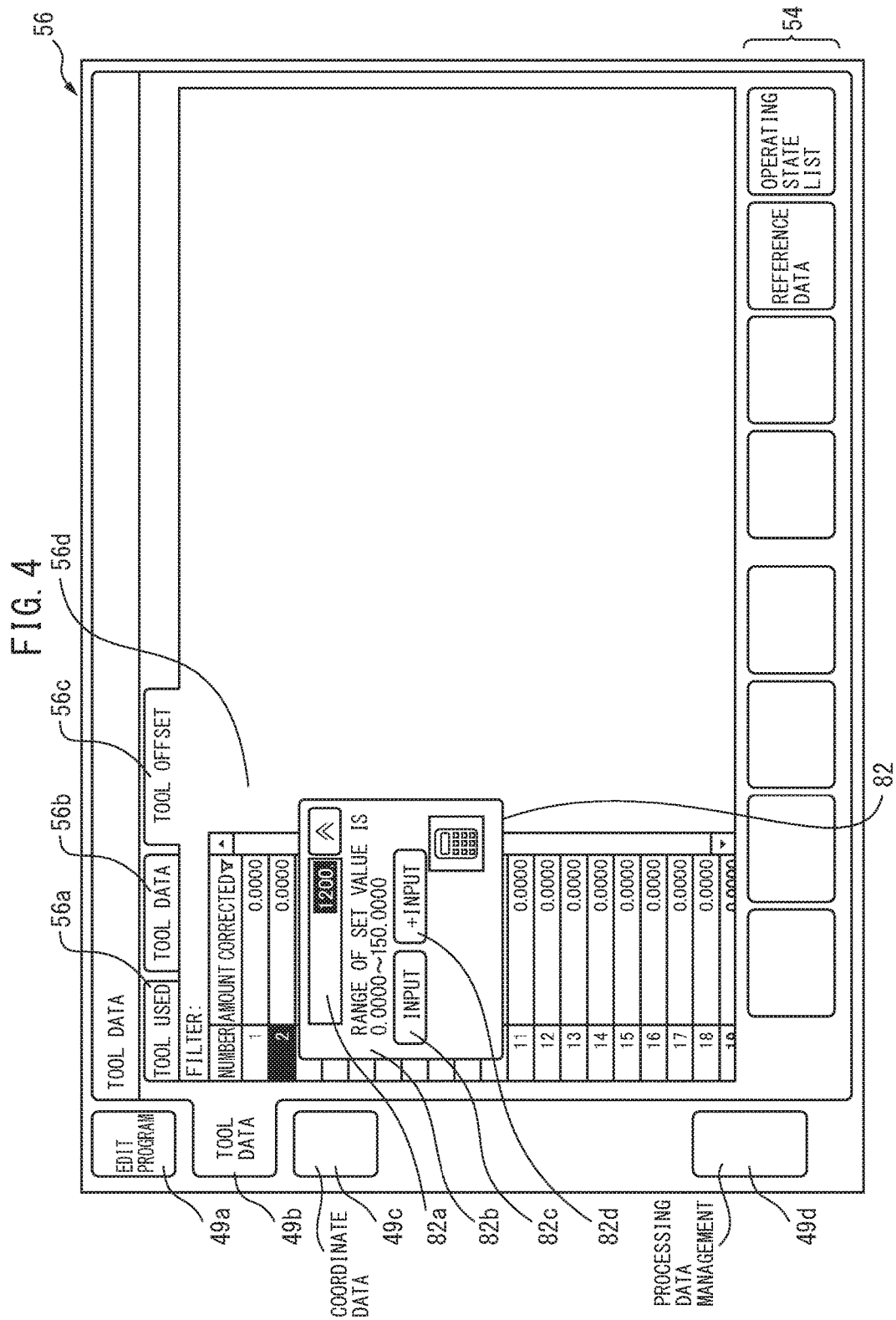
FIG. 4 is a first schematic diagram describing the tool data screen.

FIG. 4 shows the tool data screen for displaying and editing the tool information. The tool data screen 56 can be displayed by selecting the tool data tab 49b. The tool data screen 56 functions as an input screen for inputting and editing the tool information. The tool data screen 56 has a used tool tab 56a to select a screen displaying a tool to be used, a tool data tab 56b to select a screen for displaying and editing each tool information, and a tool offset tab 56c to input a tool offset value. In the example of FIG. 4, the tool offset tab 56c has been selected.

The tool offset screen of the tool data screen 56 has a display region 56d. In the display region 56b, a correspondence table between a number specified by the processing program and a tool path correction amount described in the processing program is displayed. As the correction amount, the actual tool length of the tool specified by the processing program can be exemplified. By selecting the item of the predetermined tool, the input auxiliary screen 82 is displayed. The input region 82a and buttons 82c and 82d are displayed in the input auxiliary screen 82. By pressing the buttons 82c and 82d, the numbers input into the input region 82a are reflected corresponding to the respective items.

The display part 28, when the number input into the input region 82a differs from the predetermined range, displays a warning in the warning region 82b of the input auxiliary screen 82. In this example, the warning is displayed as the number input into the input region 82a is greater than the predetermined range. In this embodiment, when the input information violates the predetermined rules, the warning is displayed in the input auxiliary screen 82. Further, by displaying the warning in the input auxiliary screen 82, input errors by a user can be reduced. Further editing of the tool information can be easily carried out.

Figure 5:
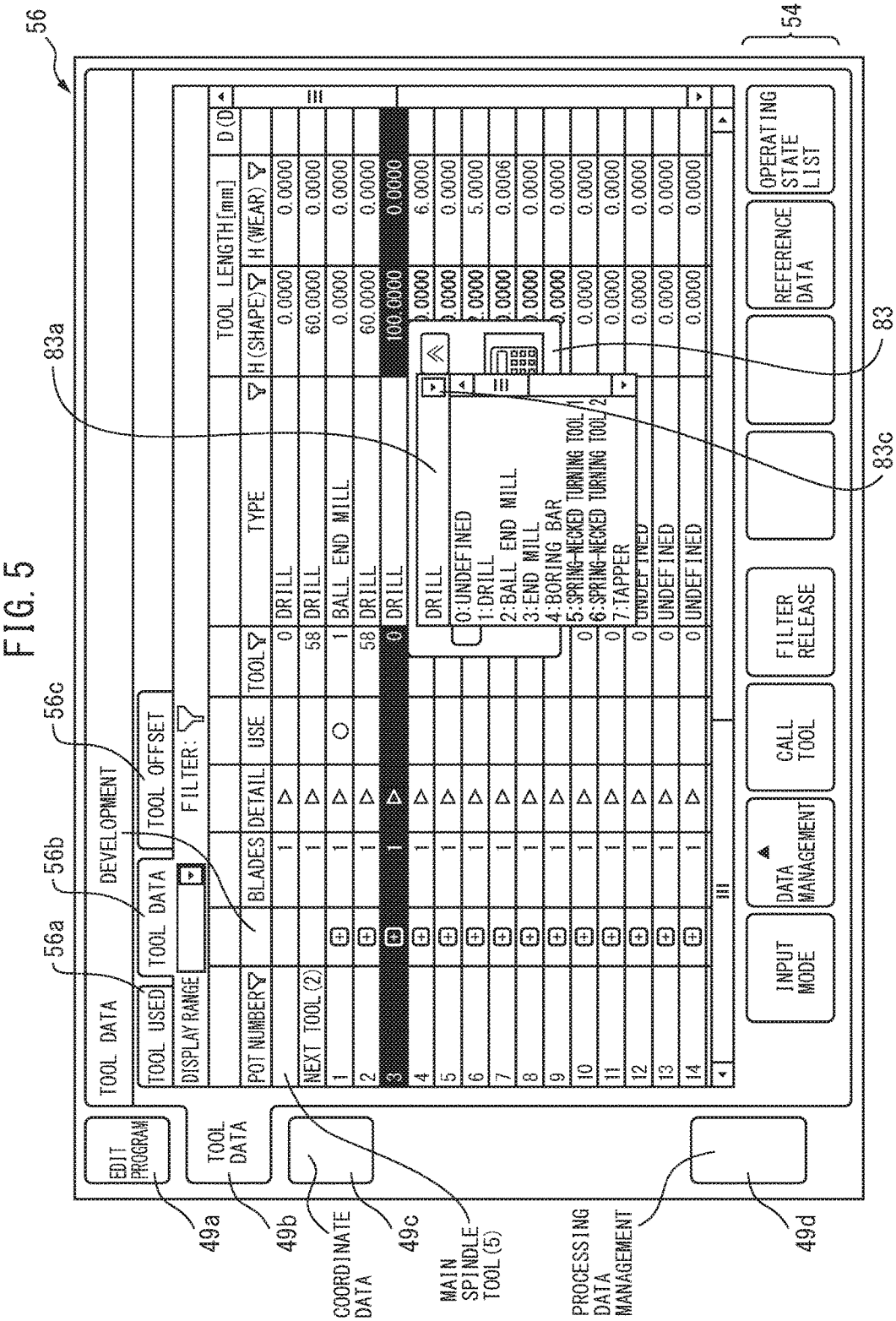
FIG. 5 is a second schematic diagram describing the tool data screen.

FIG. 5 shows another tool data screen for displaying and editing the tool information. In the example shown in FIG. 5, the tool data tab 56b has been selected. This display screen displays the tool information of the respective tools such as the tool number, tool type and tool length etc. By selecting a predetermined tool item, an input auxiliary screen 83 is displayed. In the input auxiliary screen 83, an input region 83a and a button 83c are displayed. In the input auxiliary screen 83, by pressing the button 83c, an example of information regarding what can be input into the item to be inputted is displayed. In the example shown in FIG. 5, when the type of tool used is edited, by pressing the button 83c, a list of tool designations recorded in the storage part 26 is displayed. The user can select the desired designation from the list of tool designations and can easily input the tool designation.

Figure 6:
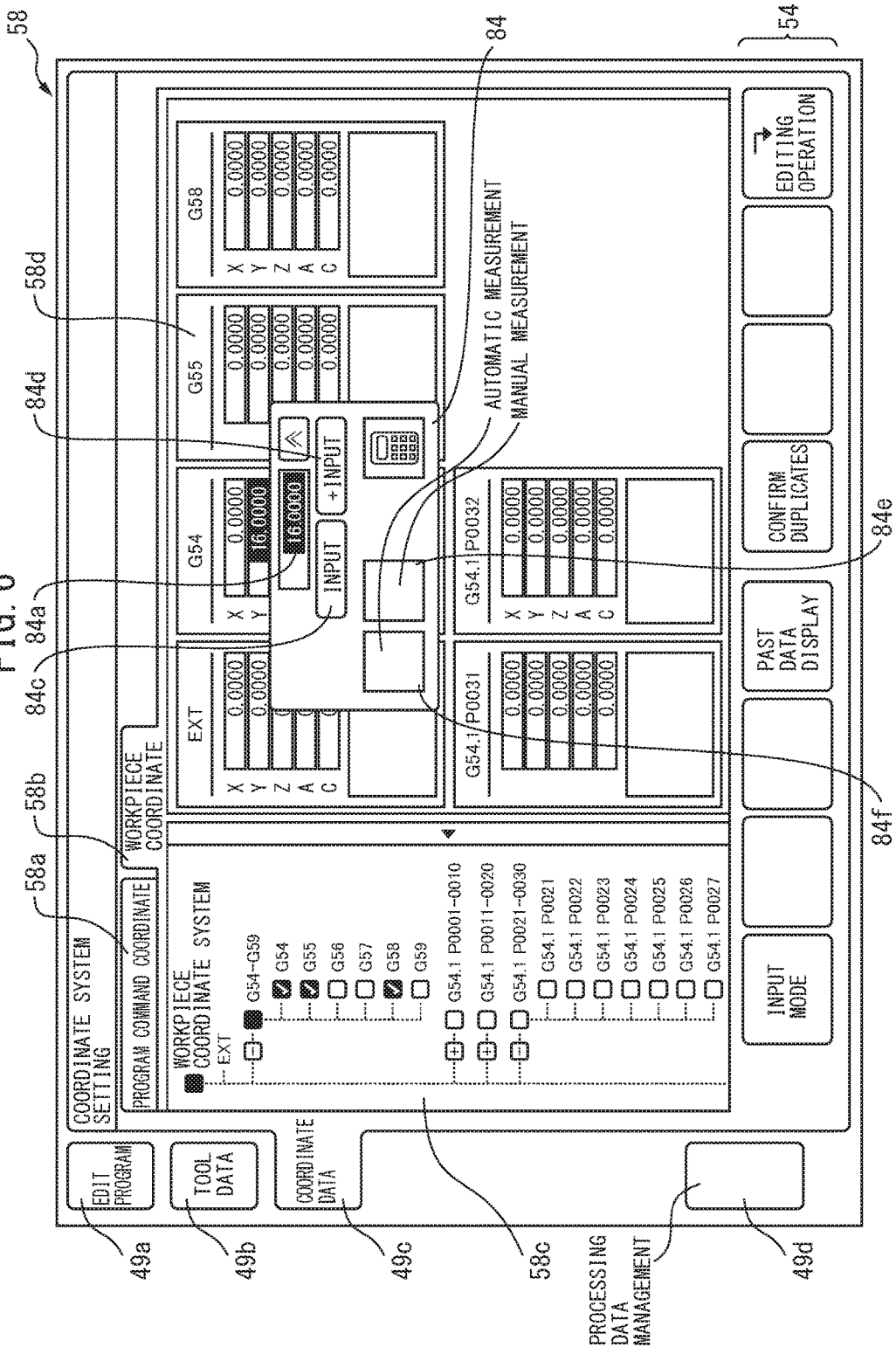
FIG. 6 is a schematic diagram describing a coordinate data screen and a first input auxiliary screen related to coordinate information.

FIG. 6 illustrates the coordinate data screen for displaying and editing the coordinate information. The coordinate data screen 58 functions as an input screen for inputting and editing the coordinate information. By selecting the coordinate data tab 49c, the coordinate data screen 58 can be displayed. In the coordinate data screen 58, a program command coordinate tab 58a for displaying the coordinates used in the processing program and a tab 58b for setting the workpiece coordinates are provided. In the example shown in FIG. 6, the tab 58b has been selected.

In the coordinate data screen 58 in which the tab 58b has been selected, a list of workpiece coordinates is displayed in the display region 58c. Workpiece coordinates to be used for the present processing are displayed in the display region 58d. In this example, workpiece coordinates designated G54, G55 and G58 are used.

For each workpiece coordinate, the items for each of the X-axis, Y-axis and Z-axis as the linear feed axes, and the A-axis and C-axis as the rotational feed axes are displayed. In the entry column for each item, for example, the machine coordinates for the reference point (point of origin) on the workpiece estimated by the processing program, is input.

In the example shown in FIG. 6, the item for the Y coordinate of the workpiece coordinates designated G54 has been selected. By selecting a predetermined item on the input screen, an input auxiliary screen 84, as the first input auxiliary screen is displayed. In the present embodiment, the input auxiliary screen 84 is displayed so as to be adjacent to the selected item. Further, the input auxiliary screen 84 is displayed so as to overlap the coordinate data screen 58.

It is preferable for the coordinate information for the present processing to be set with the actual measured value from when the workpiece was arranged on the machine tool. The input auxiliary screen 84 has an input region 84a to input numbers. When the value to be inputted into the input region 84a has already been determined, it can be directly input into the input region 84a by the user. In the input auxiliary screen 84, a button 84c is provided to input the number input into the input region 84a, into the item selected in the coordinate data screen 58. Further, in the input auxiliary screen 84, a button 84d is provided which adds the number input into the input region 84a to the present value. By pressing the buttons 84c and 84d, the numbers input into the input region 84a can be reflected in the items selected in the coordinate data screen 58.

The control device for machine tool according to the present embodiment is formed such that each input value of the coordinates can be measured by the machine tool. The control device 70 can calculate the input value of each workpiece coordinate by measuring the workpiece arranged on the table. The workpiece coordinates designated G54 in the example has the point of origin positioned in the center of one surface of the rectangular parallelepiped workpiece.

First, manual measuring of the workpiece will be described. In the input auxiliary screen 84, buttons 84e and 84f are provided as the first input support buttons for supporting input of the selected item. By pressing the manual measuring button 84e, a second input auxiliary screen is displayed corresponding to manual measuring of the workpiece.

Figure 7:
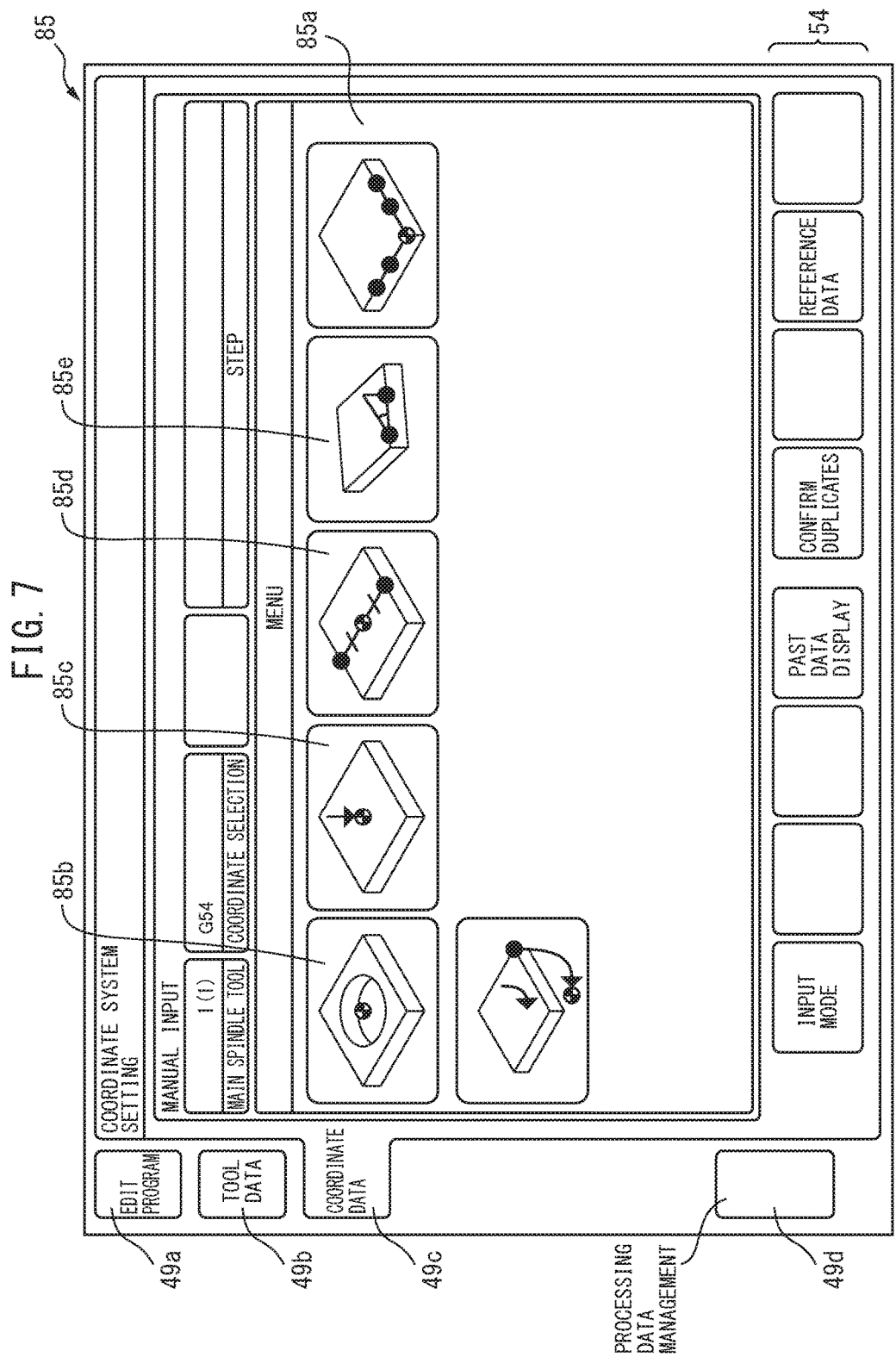
FIG. 7 is a schematic diagram describing a second input auxiliary screen related to coordinate information.

FIG. 7 shows the second input auxiliary screen when the coordinate information is set by the manual measurement. An input auxiliary screen 85, as the second input auxiliary screen has a display region 85a. The type of manual measuring can be selected in the input auxiliary screen 85. In the display region 85a, a plurality of buttons 85b to 85e on which the types of manual measurements are described are displayed. The buttons 85b to 85e function as the second input support buttons. For example, the button 85b is a button for measuring the coordinate value of the center of a circular recess in a planar shape formed in the workpiece. The button 85c is a button for measuring the coordinate value of a predetermined point of the workpiece. The button 85d is a button for measuring the median point of the workpiece in a predetermined direction. The button 85e is a button for measuring the incline angle of the surface of the workpiece. Further, buttons for other measurement methods are provided as well. In this case the button 85d corresponding to the measurement of the median point in the Y-axis direction is selected. By pressing the button 85d, the third input auxiliary screen corresponding to the input support button of the second input auxiliary screen is displayed.

Figure 8:
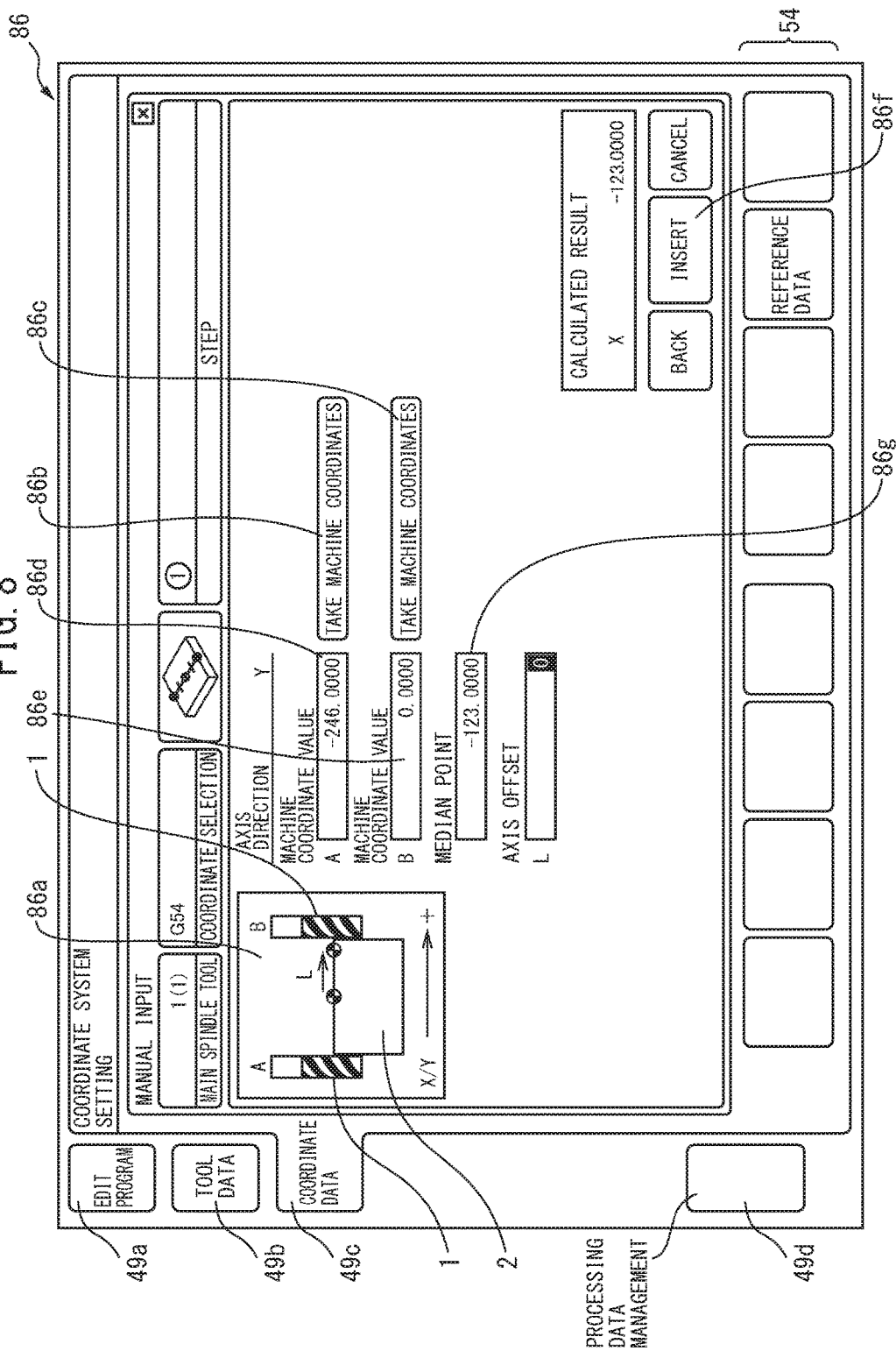
FIG. 8 is a schematic diagram describing a third input auxiliary screen related to coordinate information.

FIG. 8 shows the third input auxiliary screen when the coordinate information is set by the manual measurement. The workpiece is arranged on the machine tool table beforehand. The input auxiliary screen 86 as the third input auxiliary screen is a screen for measuring the coordinate value of the median point in a predetermined direction. The input auxiliary screen 86 has a display region 86a. In the display region 86a, a schematic diagram of the measurement procedure is shown. In this measurement example, the coordinate value of the median point in the Y-axis direction is measured.

With reference to FIG. 1 and FIG. 8, as shown in the display region 86a, in the Y-axis direction, the position where the tool 1 contacts one end face of the workpiece 2 is designated position A. Further, the position where the tool 1 contacts the workpiece on the other end face is designated position B. The tool 1 is moved relatively to the workpiece 2 manually and the workpiece 2 and the tool 1 are arranged at position A and position B. This control can be carried out by the measuring command part 29 of the control device 70. Further, the coordinate values of the machine coordinates of position A and position B are taken. This control can be carried out by the measurement information acquisition part 30. The information input control part 20, based on the coordinate values of the machine coordinates of position A and the coordinate values of the machine coordinates of position B, can calculate the coordinate values of the median point of the workpiece 2 in the Y-axis direction.

In an actual measurement procedure, first the tool 1 and the workpiece 2 are arranged at position A. By pressing the button 86b which takes the coordinate values of the machine coordinates of position A, the coordinate values of the machine coordinates can be taken into the display region 86d. Next, the tool 1 and the workpiece 2 are arranged at position B, and the button 86c which takes the coordinate values of machine coordinates is pressed. The coordinate values of the machine coordinates can be taken into the display region 86e. Thereafter, the coordinate values of the median point are calculated, and the calculated result is displayed in the display region 86g.

The user, after confirming the calculated result, presses the button 86f for transferring the calculated result, and the calculated coordinate values of the median point is displayed in the numerical value column of the Y coordinate of G54 in the display region 58d shown in FIG. 6. In this way, operations can be carried out by following the input auxiliary screen and the input support buttons displayed on the input auxiliary screen until manual measurements for setting the coordinate information is completed.

Next, automatic measurement of the workpiece to set the input value of a predetermined item of the coordinate information will be described. With reference to FIG. 6, when automatic measurement is carried out on the workpiece, by pressing automatic measurement button 84f provided on the input auxiliary screen 84 as the first input auxiliary screen, the second input auxiliary screen corresponding to automatic measurement of the workpiece is displayed.

Figure 9:
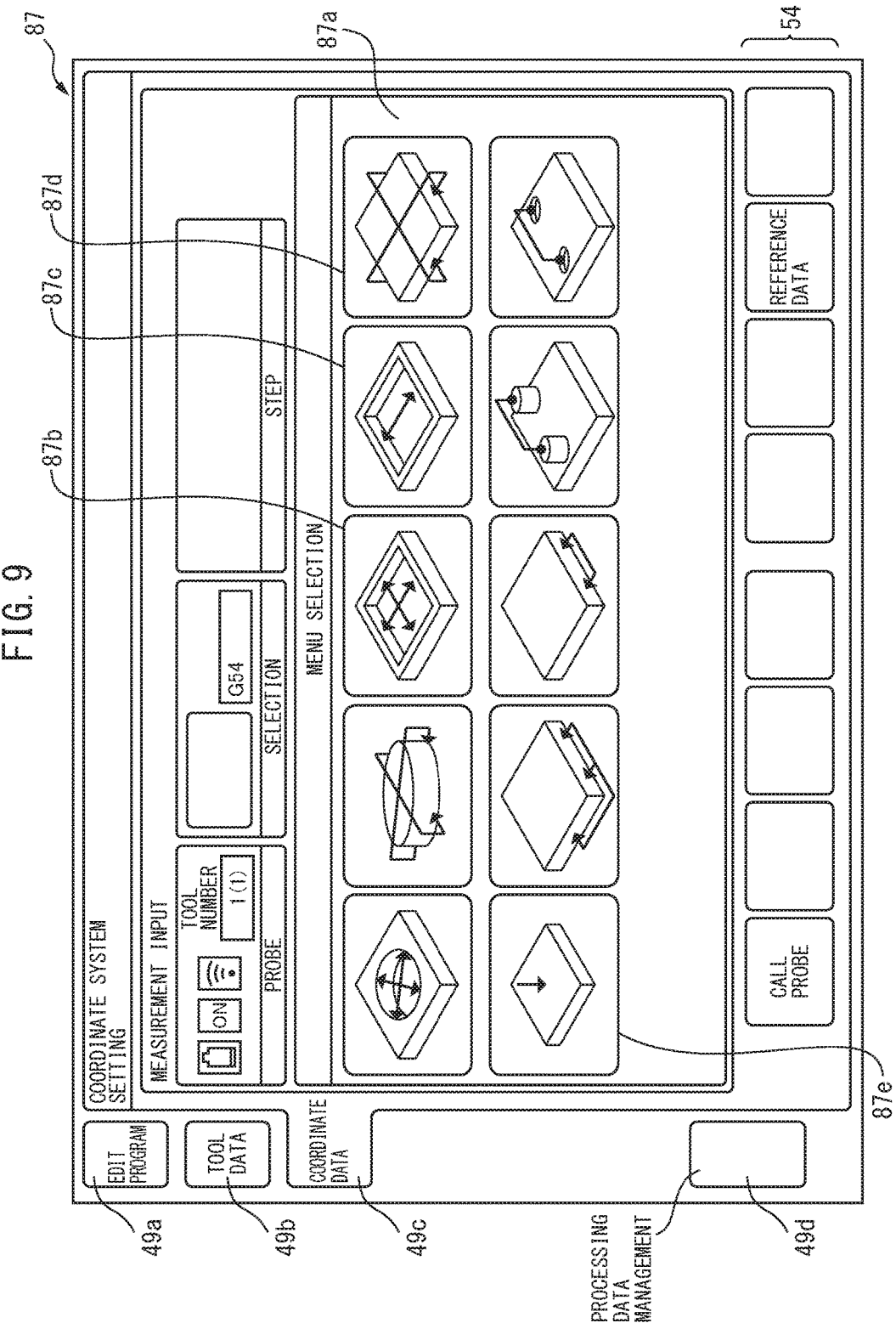
FIG. 9 is a schematic diagram describing another second input auxiliary screen related to coordinate information.

FIG. 9 shows the second input auxiliary screen when automatic measurement of the workpiece is carried out. In the input auxiliary screen 87 as the second input auxiliary screen, the type of automatic measurement is selected. The input auxiliary screen 87 has a display region 87a. In the display region 87a, a plurality of buttons 87b to 87e which display the type of automatic measurement are displayed. The buttons 87b to 87e function as second input support buttons. For example, the button 87 sets the measurement of the median point of a planar rectangular recess in a plan view in two directions. The button 87c sets the measurement of the median point of the rectangular recess in a plan view in one direction. The button 87d sets the measurement of the median point of a cuboid in two orthogonal directions. The button 87e sets the measurement of the height of one reference surface.

In this example, button 87d is selected to measure the median point. By pressing the button 87d, a third input auxiliary screen for carrying out measurement of the median point in two orthogonal directions is displayed. Namely, a third input auxiliary screen corresponding to the input support button of the second input auxiliary screen is displayed.

Figure 10:
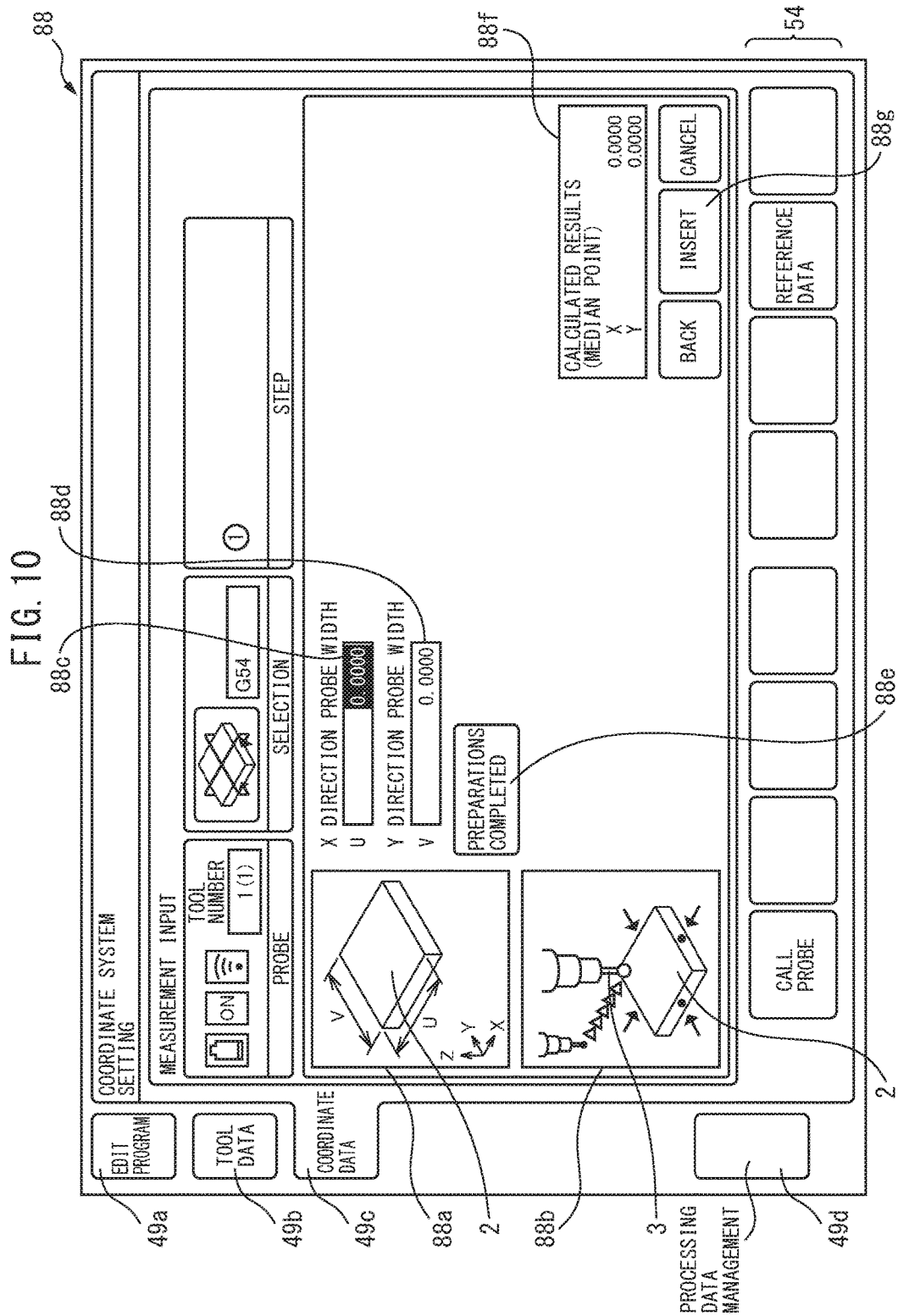
FIG. 10 is a schematic diagram describing another third input auxiliary screen related to coordinate information.

FIG. 10 shows the third input auxiliary screen when automatic measurement of a workpiece is carried out. The input auxiliary screen 88 as the third input auxiliary screen has display regions 88a and 88b. In the display region 88a, the widths U and V in the X-axis direction and the Y-axis direction to be measured automatically are displayed. In the display region 88b, the measurement point of the workpiece 2 is displayed. As shown in the display region 88b, a probe 3 is mounted on the main spindle. The control device 70 can automatically read the coordinate value of the machine coordinates when the probe 3 contacts the end surface of the workpiece 2.

The user reads the rough width of U of the workpiece 2 in the X-axis direction from a drawing, etc. and inputs it into the input region 88c. The width U at this time is a value input to set the range of movement of the probe 3 so a rough value is fine. Further, similarly the rough width of V of the workpiece 2 in the Y-axis direction is read from a drawing etc. and is input into the input region 88d. The user determines a rough position for the probe 3 by an operation of the operation panel 41 such that it is positioned above a nearly central position of the workpiece 2. Then, by pressing the button 88e, the control device 70 recognizes that preparations are complete. Next, by pressing the measurement start button 45 (refer to FIG. 2) of the operation panel 41, automatic measurement starts.

With reference to FIG. 1 and FIG. 10, the measuring command part 29 sets position of the probe 3 to which it is to be moved relatively to the workpiece 2 with reference to the rough widths U and V in the respective directions. Then, the probe 3 is made to contact the end surface of the workpiece 2 as shown in the display region 88*b* in accordance with a command of the measuring command part 29. The measurement information acquisition part 30 acquires the coordinate value of the machine coordinates when the probe 3 contacts the end surface of the workpiece 2. The information input control part 20 calculates the median point in the X-axis direction and the median point in the Y-axis direction, and displays the calculated coordinated values of the median points in the display region 88*f*.

After confirming the calculated results, the user presses the button 88*g* for transferring the calculated results. As a result, the coordinate values of the calculated median point are displayed in the value column of the X coordinate and the value column of the Y coordinate of G54 of the display region 58*d* shown in FIG. 6. In this way the control device of the present embodiment can carry out automatic measurement to set the coordinate information by instructions on the input auxiliary screen and the input support button displayed on the input auxiliary screen.

In the control device of the present embodiment, when one item of processing information is selected in the input screen, a first input auxiliary screen corresponding to the one item is displayed. In the first input auxiliary screen, an input support button for supporting input is provided. By pressing the input support button a second input auxiliary screen corresponding to the input support button is displayed. Further, by operating as instructed by the second input auxiliary screen, the one item on the input screen can be inputted into. As the input support button is provided in the input auxiliary screen of the present embodiment, it is possible to prevent a user from overlooking the input support function. The user is ensured of selecting the most preferable input support function from the input support functions of the machine tool. The state in which the user does not find an appropriate input support function and the use of a different input support function from the appropriate input support function by a user can be avoided despite the existence of an appropriate support function. As a result, the operation efficiency of inputting the processing information can be improved and input errors by a person can be reduced.

In the aforementioned example of carrying out measurements on the workpiece, the first input support button is provided to carry out measurement of the workpiece, in the first input auxiliary screen. By pressing the first input support button, the second input auxiliary screen is displayed. In the second input auxiliary screen, a plurality of second input support buttons to select the type of measurement are displayed. By pressing the second input support button, a third input auxiliary screen for carrying out the selected type of measurement is displayed. There exists many types of measurement method for the workpiece, further, the operation of the machine tool differs depending on the measuring method. However, by adopting this configuration, a user can carry out appropriate operations by following the instructions on the input auxiliary screen and the input support button until the measurement is completed. The user can easily and surely carry out measurements on the workpiece and input the measured values into the predetermined item on the input screen of the processing information.

Further, in the above embodiment, the discussion has been directed to the measurement of the workpiece carried out to set the coordinate information. However, not being limited thereto, in the case of carrying our measurements on a tool to set the tool information, by repeatedly displaying the input auxiliary screens and pressing the input support buttons, measurement of the tool can be easily carried out. For example, in the input auxiliary screen 82 of the tool data screen 56, which displays tool information shown in FIG. 4, an input support button may be provided to carry out measurement of the tool mounted on the machine tool. When a tool offset value is set, by pressing the input support button provided on the input auxiliary screen 82, another input auxiliary screen is opened and the tool length or the tool diameter can be measured.

Furthermore, the present invention may be applied to a control device which inputs letters or numbers into an input screen to input or edit optional processing information. For example, the processing information may include, workpiece measurement information including information on inspection of the machined workpiece. The workpiece measurement information may include, the measurement procedures or the measurement result obtained when measurement on the workpiece is carried out. In the input screen of the measurement results of the workpiece, when the item for measurement results is selected, the first input auxiliary screen may be formed to open. Further, by pressing the input support button displayed in the first input auxiliary screen, the second input auxiliary screen is opened, and by operating according to the second input auxiliary screen, the measurement of the workpiece can be carried out.

In the above embodiment, the second input support button is provided in the second input auxiliary screen. However, not being limited hereto, the second input support button need not be displayed in the second input auxiliary screen. For example, with reference to FIG. 6, the plurality of types of manual measurement buttons may all be provided in the input auxiliary screen 84 as the first input auxiliary screen. In this case, when a predetermined manual measurement method is selected in the first input auxiliary screen, an input auxiliary screen like the input auxiliary screen 86 shown in FIG. 8 may be displayed.

Further, in the present embodiments, as the input auxiliary screens, examples of displaying three input auxiliary screens from the first input auxiliary screen to the third input auxiliary screens have been described. However, not being limited to these embodiments, more input auxiliary screens may be displayed. When there are selectable features in an input auxiliary screen, an input support button may be provided and the selectable feature may be selected in the subsequent input auxiliary screen. In this way it is preferable that the control device, by repeatedly displaying the input auxiliary screens and pressing the input support buttons, is operable until the measurement of the workpiece or the measurement of the tool is completed. According to this configuration, by merely paying attention to the input auxiliary screen and the input support button, the user can carry out measurement of the workpiece or tool in the optimal method and input necessary information into the items of the input screen.

Each of the above embodiments can be appropriately combined. For example, while displaying the input support button in the input auxiliary screen, a warning may be displayed when a number is mistakenly input into the input region. Namely, one of the features of the present invention reside in that by pressing the input support button on the first input auxiliary screen, a second input auxiliary screen corresponding to the input support button is displayed. Further, other features of the present invention reside in that a warning message is displayed, and that, as shown in the input auxiliary screen 83 of FIG. 5, information on the designation of the tool is displayed.

The control device of the present embodiment, in addition to a machining center which carries out cutting by a tool such as an end mill or milling machines, is applicable to any machine tool such as a lathe, grinding machine or an electric discharge machine.

In each of the aforementioned drawings, the same or corresponding parts use the same reference signs. Note that, the aforementioned embodiments are examples and the invention is not limited thereto. Further, the embodiments include changes thereto as indicated in the claims.

REFERENCE SIGNS LIST 1 tool
2 workpiece
11 machine tool
20 information input control part
28 display part
29 measuring command part
30 measurement information acquisition part
32 various sensors
55 program editing screen
56 tool data screen
58 coordinate data screen
81 to 84 input auxiliary screens
81b and 82b warning region
84e and 84f button
85 to 88 input auxiliary screen
85b to 85e and 87b to 87e buttons
70 control device
71 input part
76 processing program
77 tool information
78 workpiece information

The invention claimed is:

1. A control device for a machine tool which carries out processing by a relative movement of a tool with respect to a workpiece based on a processing program, comprising:
a graphical user interface which displays an input screen for inputting or editing processing information related to processing the workpiece; and
a keypad for inputting at least one of letters and numbers into an item of the processing information in the input screen;
wherein the control device is configured to receive a result of a measurement of the tool or the workpiece,
the graphical user interface, when one item of the processing information is selected in the input screen related to tool data or workpiece coordinate data, displays a first input auxiliary screen corresponding to the one item,
an input support button corresponding to the one item is provided on the first input auxiliary screen in order to support input,
the graphical user interface displays a second input auxiliary screen, indicating types and procedures of measurements of the tool or the workpiece to be selected, when the input support button provided on the first input auxiliary screen is pressed,
the graphical user interface is configured to initiate the measurement of the tool or the workpiece in response to an operation on the graphical user interface, and
the measurement result of the tool or the workpiece is acquired and can be input into the one item of the input screen.

2. The control device for a machine tool according to claim 1, wherein
the second input auxiliary screen displays a plurality of second input support buttons to select the type of measurement, and
a third input auxiliary screen is displayed to carry out a selected type of measurement when the second input support button is pressed.

3. The control device for a machine tool according to claim 1, wherein the first input auxiliary screen has an input region to input input information formed of at least one of letters and numbers, and when the input information input into the input region violates the predetermined rules, a warning message is displayed in the first input auxiliary screen.

* * * * *